(12) United States Patent
Karlsson et al.

(10) Patent No.: US 10,153,701 B2
(45) Date of Patent: Dec. 11, 2018

(54) CONTROLLING A SWITCHED MODE POWER SUPPLY WITH MAXIMISED POWER EFFICIENCY

(75) Inventors: Magnus Karlsson, Oskarshamn (SE); Anders Kullman, Kalmar (SE); Fredrik Wahledow, Färjestaden (SE); Henrik Borgengren, Kalmar (SE); Jonas Malmberg, Färjestaden (SE); Oscar Persson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1018 days.

(21) Appl. No.: 14/002,955

(22) PCT Filed: Mar. 3, 2011

(86) PCT No.: PCT/EP2011/053177
§ 371 (c)(1),
(2), (4) Date: Sep. 3, 2013

(87) PCT Pub. No.: WO2012/116750
PCT Pub. Date: Sep. 7, 2012

(65) Prior Publication Data
US 2013/0343094 A1    Dec. 26, 2013

(51) Int. Cl.
*H02M 3/335* (2006.01)
*H02M 3/337* (2006.01)
*H02M 1/00* (2006.01)

(52) U.S. Cl.
CPC ........ *H02M 3/33507* (2013.01); *H02M 3/337* (2013.01); *H02M 2001/0022* (2013.01)

(58) Field of Classification Search
CPC .. H02M 3/33507; H02M 3/337; H02M 3/156; H02M 3/157; H02M 3/158; H02M 2001/0022; H02M 2001/0016
USPC ..... 363/15–21.01, 21.04–26, 37, 40, 41, 89, 363/95, 98, 127, 131–134; 323/207–211, 323/222–226, 271–275, 280, 281, 323/282–287, 299–303, 351; 327/175, 327/154, 155
See application file for complete search history.

(56) References Cited

U.S. PATENT DOCUMENTS

| | | | |
|---|---|---|---|
| 4,347,474 A * | 8/1982 | Brooks et al. | 323/224 |
| 2005/0110474 A1* | 5/2005 | Ortiz | H02M 1/14 323/282 |
| 2006/0239042 A1 | 10/2006 | Fukumoto | |
| 2009/0200996 A1* | 8/2009 | Ojanen et al. | 323/234 |
| 2010/0142233 A1 | 6/2010 | Huang et al. | |
| 2010/0231183 A1 | 9/2010 | Jan et al. | |

(Continued)

*Primary Examiner* — Timothy J Dole
*Assistant Examiner* — Carlos Rivera-Perez

(57) ABSTRACT

A control circuit for a switched mode power supply (SMPS) has an input voltage reference voltage generator arranged to receive a signal indicative of an input voltage of the SMPS and is arranged to generate a reference signal directly proportional to the input voltage. An error signal generator of the control circuit is arranged to receive a signal indicative of an output voltage of the SMPS and arranged to generate an error signal based on the reference signal generated by the input reference voltage generator and based on the output voltage of the SMPS. A duty cycle control signal generator of the control circuit is arranged to generate a control signal, to control the duty cycle of the SMPS, in dependence upon the error signal.

22 Claims, 15 Drawing Sheets

(56) References Cited

U.S. PATENT DOCUMENTS

| 2011/0026275 A1* | 2/2011 | Huang et al. .............. 363/21.02 |
| 2015/0055375 A1* | 2/2015 | Karlsson et al. ............... 363/17 |
| 2015/0109825 A1* | 4/2015 | Karlsson et al. ............... 363/17 |

* cited by examiner

CONTROLLING A SWITCHED MODE POWER SUPPLY WITH MAXIMISED POWER EFFICIENCY

TECHNICAL FIELD

The present invention generally relates to the field of switched mode power supplies (sometimes referred to as switch mode power supplies of switching mode power supplies) and more specifically to the control of the duty cycle of a switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching defining the efficiency with which an input voltage is converted to a desired output voltage.

In most SMPS topologies, the output voltage, $V_{out}$, is directly proportional to the input voltage, $V_{in}$:

$$V_{out} \propto nDV_{in} \qquad \text{Equation 1}$$

In Equation 1 above, D is the duty cycle of the switching, and $n=n_s/n_p$ is the transformer ratio (the number of turns on the secondary side, $n_s$, divided by the number of turns on the primary side, $n_p$) if a transformer is used in the SMPS or $n=1$ if no transformer is used.

The duty cycle is therefore critical in maintaining a high efficiency; a duty cycle of 100% will produce the maximum efficiency.

A number of different control strategies for controlling the duty cycle of an SMPS are known.

One method of control is used in fixed ratio converters or Intermediate Bus Converters also referred to as unregulated converters. These lack all control of the output voltage but run with a maximised duty cycle. This yields maximised power efficiency since the converter transfers energy almost 100% of the time, with the exception of the dead time needed during switching. With this strategy, the output voltage varies with the input voltage according to Equation 1 above. Unregulated converters with different topologies are disclosed for example in U.S. Pat. No. 7,272,021, U.S. Pat. No. 7,558,083, U.S. Pat. No. 7,564,702 and U.S. Pat. No. 7,269,034. Furthermore, narrow regulation of the voltage can be taken care of by second layer SMPSs called Point of Load regulators, this power architecture being referred to as Intermediate Bus Architecture, for example as disclosed in U.S. Pat. No. 7,787,261.

Semi-regulated converters compensate for a varying input voltage (line regulation) at the expense of a varying duty cycle, which reduces power efficiency. Such a converter is disclosed for example in U.S. Pat. No. 7,787,261. The load affects the output voltage and the output voltage decreases with increasing load, also known as droop. Since the output of an SMPS has an LC filter then load transients cause the output voltage to oscillate, and only inherent parasitic resistances dampen the oscillations.

Quasi-regulated bus converters, for example as disclosed in U.S. Pat. No. 7,787,261, are line regulated in only a part of the input voltage range, while in other parts of the input voltage range they are unregulated using 100% duty cycle to maximise efficiency. This yields an increased input voltage range without increasing the output voltage range.

Output regulated converters compensate for varying load conditions and input voltage changes by feedback of the output voltage. Voltage feed forward is often added in order to reduce output voltage disturbances due to input voltage transients. This type of regulation offers the most stable output voltage at the cost of lower efficiency.

Irrespective of the control strategy, it is preferable for the output voltage of an SMPS to remain at its desired level under all conditions. However, transients and changes of the input voltage will cause the output voltage to change almost immediately. This can introduce large changes in the output voltage of the SMPS. Typically, only the inertia in an output filter of the SMPS will decrease this effect.

All the above-described control strategies have drawbacks in terms of output voltage tolerance, transient responses and power efficiency. Furthermore, many of these variables are dependent and optimising one makes the others worse.

SUMMARY

In view of the problems in known SMPS control strategies, the present invention aims to provide an apparatus and method for generating a control signal to control the duty cycle of an SMPS is such a way that a high power efficiency is maintained, compared to known strategies, whilst improving the output voltage response to transients.

In general terms, the invention introduces load regulation into a fixed ratio converter and maximises efficiency at the same time, and an embodiment improves the damping of the oscillations on the output voltage due to input voltage transients, while maintaining the duty cycle near to 100%.

More specifically, according to the present invention, a control circuit is operable to generate a control signal for controlling the duty cycle of a switched mode power supply. The control circuit comprises an input reference voltage generator that is operable to receive a signal indicative of an input voltage of the switched mode power supply and is operable to generate a reference signal dependent upon the input voltage. An error signal generator of the control circuit is operable to receive a signal indicative of an output voltage of the switched mode power supply and is operable to generate an error signal based on the reference signal generated by the input reference voltage generator and based on the output voltage of the switched mode power supply. A duty cycle control signal generator of the control circuit is operable to generate a control signal to control the duty cycle of the switched mode power supply in dependence upon the error signal.

The present invention also provides a method of generating a control signal for controlling the duty cycle of a switched mode power supply. The method comprises receiving a signal indicative of an input voltage of the switched mode power supply and receiving a signal indicative of an output voltage of the switched mode power supply. The method further comprises generating a reference signal that is dependent upon the input voltage. The method further comprises generating an error signal based on the reference signal and based on the output voltage. The method further comprises generating a control signal to control the duty cycle of the switched mode power supply in dependence upon the error signal.

These features provide a number of advantages. For example, because the duty cycle is varied in dependence upon the input voltage of the switched mode power supply and in dependence upon the output voltage of the switched mode power supply, this allows more accurate control of the duty cycle to maintain maximal power efficiency whilst compensating for voltage transients.

BRIEF DESCRIPTION OF THE DRAWINGS

Embodiments of the invention will now be described, by way example only, with reference to the accompanying drawings in which.

DETAILED DESCRIPTION OF EMBODIMENTS

As will be explained in detail below, the present invention proposes a control strategy for a switched mode power supply. The control strategy maintains a high power efficiency and still improves the output voltage response when faced with input voltage transients or load current transients at the output.

Figure 1:
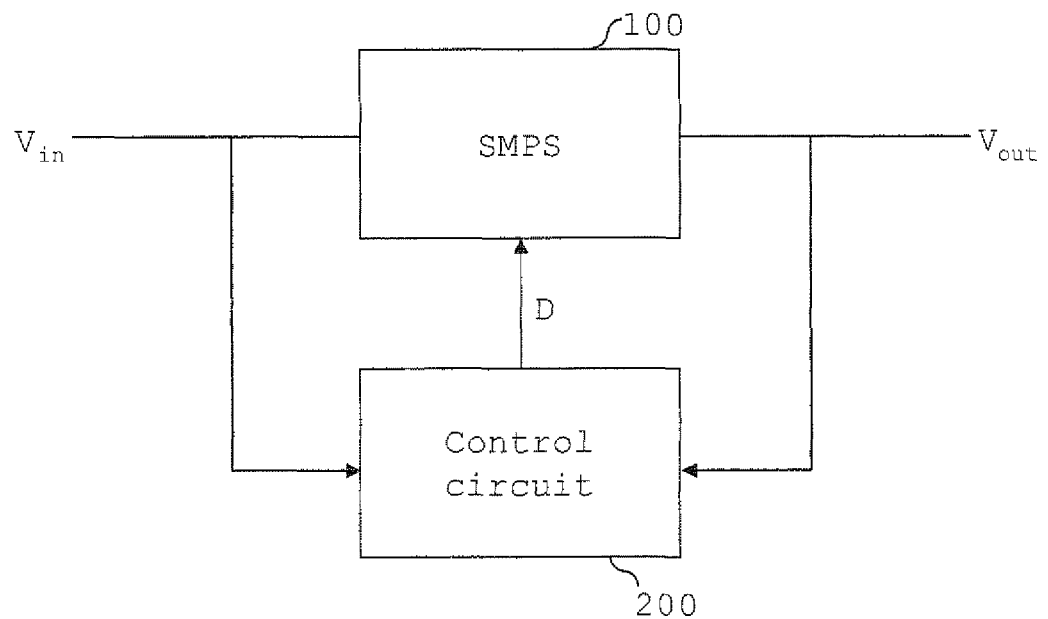
FIG. 1 is a block diagram of a switched mode power supply and a control circuit according to a first embodiment of the present invention for generating a control signal for controlling the switched mode power supply.

FIG. 1 depicts a top-level block diagram of a switched mode power supply (SMPS) 100 and control circuit 200. The control circuit 200 is arranged to receive signals indicative of the input voltage $V_{in}$ and the output voltage $V_{out}$ of the SMPS 100. These signals may comprise analogue signals of the voltages themselves or digital signals containing information defining voltage values measured by measurement equipment (not shown). Based on these voltages, the control circuit 200 is operable to generate a control signal D to control the duty cycle of the switched mode power supply 100. It will be appreciated that the control circuit 200 can be made and sold separately from the SMPS 100.

Figure 2:
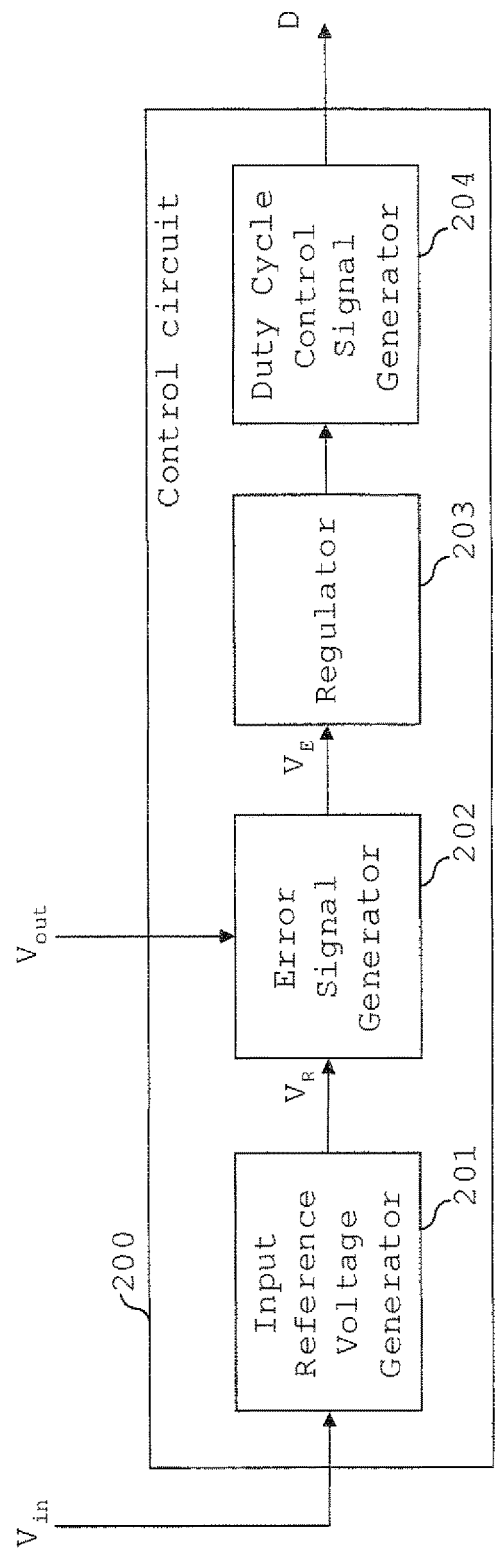
FIG. 2 is a block diagram showing further detail of the control circuit according to the first embodiment of the present invention.

FIG. 2 is a schematic block diagram of the control circuit 200. The control circuit 200 comprises an input reference voltage generator 201, an error signal generator 202, optionally a regulator 203, and a duty cycle control signal generator 204.

The input reference voltage generator 201 is operable to receive a signal indicative of an input voltage $V_{in}$ of the switched mode power supply 100 and operable to generate a reference voltage $V_R$ dependent upon the input voltage $V_{in}$.

The error signal generator 202 is arranged to receive a signal indicative of the output voltage $V_{out}$ of the switched mode power supply 100, as well as the reference signal $V_R$ generated by the reference voltage generator 201. The error signal generator 202 is operable to generate an error signal $V_E$ based on the reference signal $V_R$ and based on the output voltage $V_{out}$.

For comparison, in a known fully-regulated converter, which uses a fully-regulated control strategy, the control circuit measures the output voltage $V_{out}$ of the switched mode power supply 100, and this is then compared with a constant reference signal equal to the desired output voltage or directly proportional to the desired output voltage. In contrast, as explained herein, in embodiments of the present invention the reference signal $V_R$ is not constant, but instead is directly proportional to the input voltage $V_{in}$ of the switched mode power supply 100.

The error signal $V_E$ is then fed into an optional regulator 203, or, if the regulator 203 is not provided, the error signal $V_E$ is fed into the duty cycle control signal generator 204. The regulator 203 is operable to generate a signal defining a duty cycle ratio in dependence upon the error signal $V_E$.

The duty cycle control signal generator 204 is arranged to receive the output of the regulator 203 (or the error signal $V_E$ if the regulator is not provided) and is operable to generate the required control signal D to control the duty cycle of the switched mode power supply 100.

Figure 3:
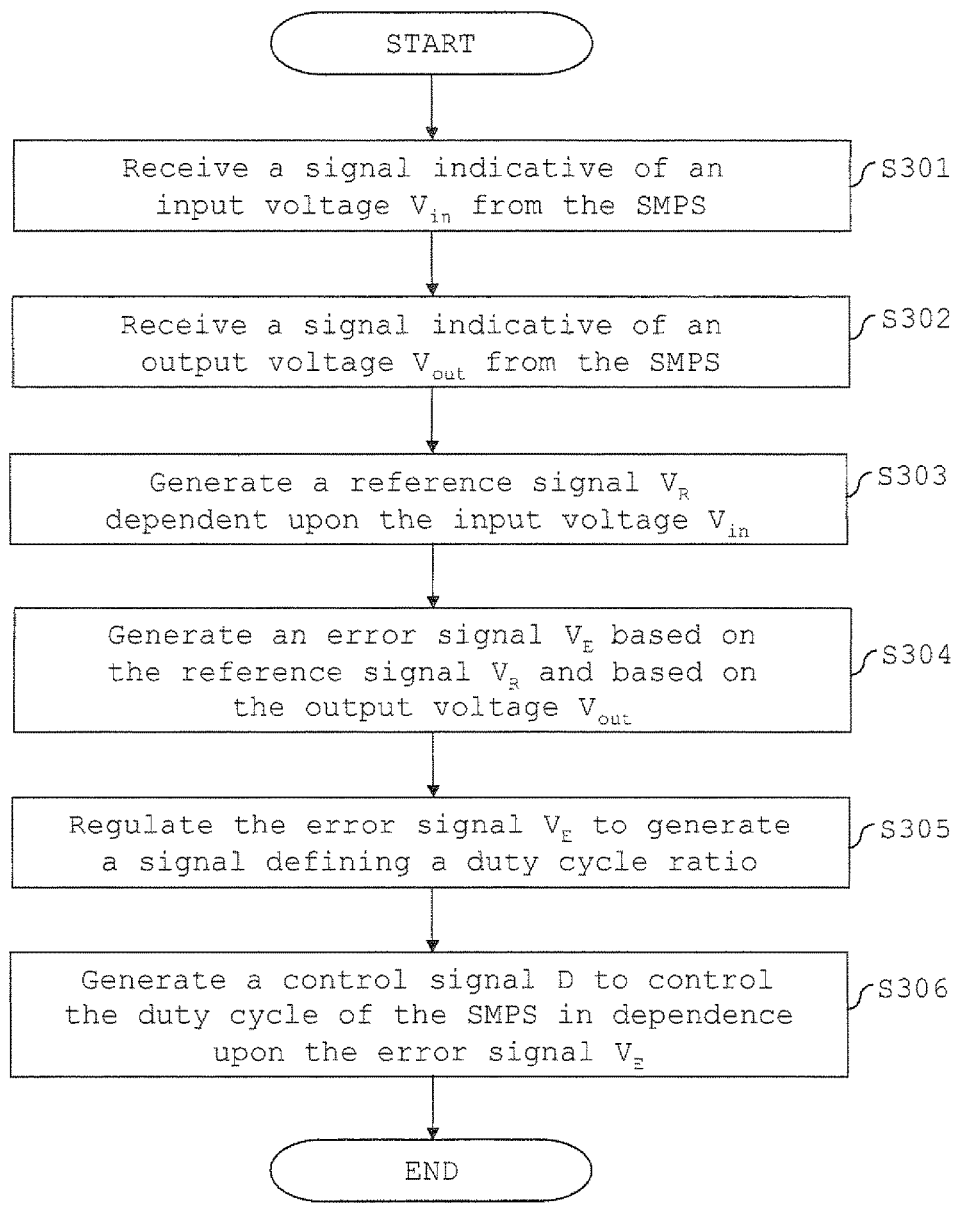
FIG. 3 is a flowchart showing the processes performed by the components of FIG. 2.

FIG. 3 shows a flowchart of the processing operations performed by the control circuit 200 of FIG. 2 for generating a control signal D to control the duty cycle of a switched mode power supply 100.

Referring to FIG. 3, at step S301 the input reference voltage generator 201 receives a signal indicative of an input voltage $V_{in}$ from the SMPS 100. The received signal may be an analogue representation of the input voltage $V_{in}$ of the SMPS 100 or it may be a digital representation.

At step S302, the error signal generator 202 receives a signal indicative of the output voltage $V_{out}$ of the SMPS 100.

At step S303, the input reference voltage generator 201 generates a reference signal $V_R$ that is dependent upon the input voltage $V_{in}$.

At step S304, the error signal generator 202 generates an error signal $V_E$ based on the reference signal $V_R$ and based on the output voltage $V_{out}$.

Optionally, the process may then proceed with step S305, at which the regulator 203 regulates the error signal $V_E$ to generate a signal defining a duty cycle ratio.

At step S306, a control signal D is generated to control the duty cycle of the SMPS 100. The generated control signal D is dependent upon the error signal $V_E$, and, if the regulation step of S305 is performed, then the control signal D is generated in dependence upon the signal defining a duty cycle ratio.

Figure 4:
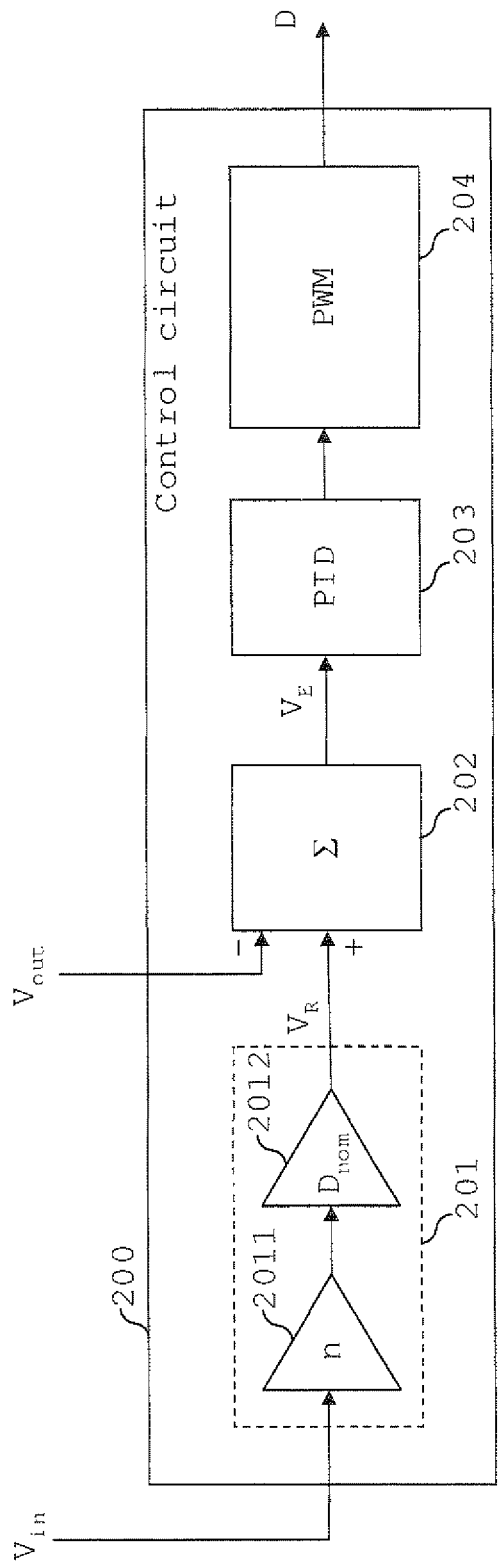
FIG. 4 is a block diagram showing yet further detail of the control circuit according to the first embodiment of the present invention.

Further details of the operation of the control circuit 200 will now be described with reference to a specific embodiment as shown in FIG. 4.

Referring to the specific embodiment of FIG. 4, the input reference voltage generator 201 comprises a transformer turns ratio multiplier 2011 and a nominal duty cycle multiplier 2012. It should be noted that, if the SMPS 100 does not have a transformer, then the transformer turns ratio multiplier 2011 is omitted.

The transformer turns ratio multiplier 2011 is operable to multiply the input voltage $V_{in}$ of the switched mode power supply 100 by a transformer turns ratio n, where $n=n_s/n_p$ and $n_s$=turns on the secondary side of the transformer, $n_p$=turns on the primary side of the transformer.

The nominal duty cycle multiplier 2012 is operable to multiply the output of the transformer turns ratio multiplier 2011 by a nominal duty cycle ratio $D_{nom}$, which is discussed in further detail later.

Therefore, the reference signal $V_R$ is generated by multiplying the input voltage $V_{in}$ of the switched mode power supply 100 by the transformer turns ratio n and a nominal duty cycle $D_{nom}$, in accordance with the following equation.

$$V_R nD_{nom} V_{in} \quad \text{Equation 2}$$

As explained below, with this reference signal $V_R$, the duty cycle of the switched mode power supply will be controlled to be almost constant and close to $D_{nom}$.

Referring again to FIG. 4, the error signal generator 202 in this embodiment comprises a difference calculator, which compares the generated reference signal $V_R$ with a signal indicative of the output voltage $V_{out}$ of the switched mode power supply 100. To achieve this, in this embodiment, the difference is found between the output voltage $V_{out}$ and the reference signal $V_R$ to generate the error signal $V_E$, as detailed by the following equation:

$$V_E = (nD_{nom}V_{in}) - V_{out} \quad \text{Equation 3}$$

The error signal is then fed into a regulator comprising PID regulator 203. The output of the PID regulator 203 is in a steady state and is the duty cycle required to obtain the required $V_{out}$ that is independent of the load current, namely:

$$V_{out} = nD_{nom}V_{in} \quad \text{Equation 4}$$

The output of the PID regulator 203 is then fed into a duty cycle control signal generator 204 which comprises a pulse width modulating circuit that translates the duty cycle ratio (from the PID regulator 203) into a pulse width modulated signal D that controls the switching elements in the SMPS 100.

Figure 5:
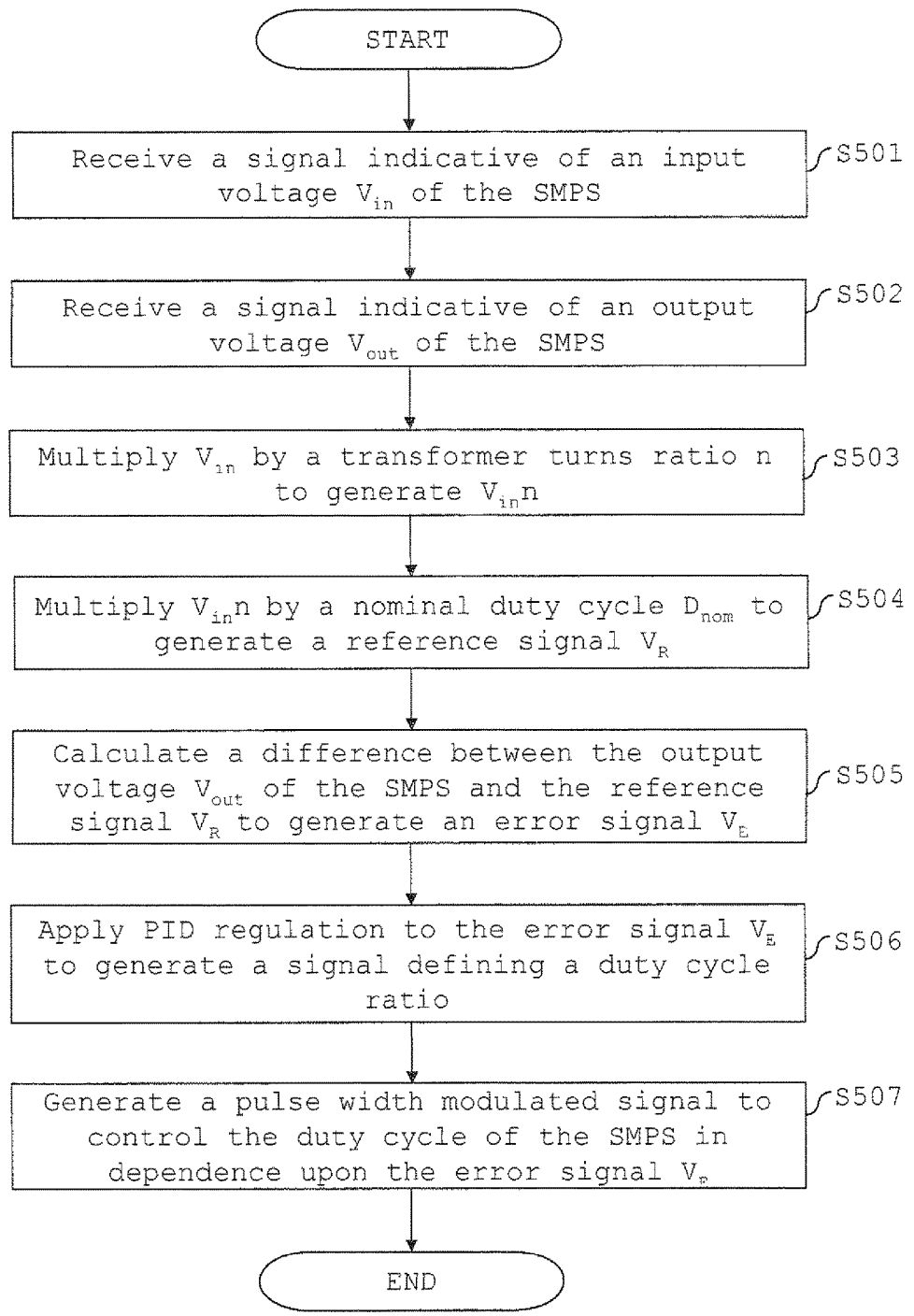
FIG. 5 is a flowchart showing the processes performed by the components of FIG. 4.

FIG. 5 shows a flowchart of the processing operations performed by the control circuit 200 of FIG. 4 for generating a control signal D to control the duty cycle of a switched mode power supply 100.

Referring to FIG. 5, at step S501 the input reference voltage generator 201 receives a signal indicative of an input voltage $V_{in}$ from the SMPS 100. The received signal may be an analogue representation of the input voltage $V_{in}$ of the SMPS 100 or it may be a digital representation.

At step S502, the error signal generator 202 receives a signal indicative of the output voltage $V_{out}$ of the SMPS 100.

At step S503, the transformer turns ratio multiplier 2011 multiplies the signal indicative of the input voltage $V_{in}$ by the transformer turns ratio n This generates a signal $V_{in}$n. However, if a transformer is not included in the SMPS this step may be omitted, or the input voltage $V_{in}$ may be multiplied by 1.

At step S504, the nominal duty cycle multiplier 2012 multiplies the signal $V_{in}$n by a nominal duty cycle $D_{nom}$ to generate a reference signal $V_R$.

At step S505, the difference calculator 202 calculates a difference between the signal indicative of the output voltage $V_{out}$ of the SMPS 100 and the reference signal $V_R$ in order to generate an error signal $V_E$.

Optionally, the process may then proceed with step S506, at which the PID regulator 203 applies PID regulation to the error signal $V_E$ in order to generate a signal defining a duty cycle ratio.

At step S507, the pulse width modulator 204 generates a pulse width modulated signal to control the duty cycle of the SMPS 100 in dependence upon the error signal $V_E$. However, if the regulation step of S506 is performed then the pulse width modulated signal is generated in dependence upon the signal defining a duty cycle ratio.

In summary, it will be understood from the description of the first embodiment above that the control circuit 200 introduces load regulation into an otherwise fixed ratio converter. Instead of using a fixed duty cycle, it can be varied according to the load requirements and according to the input voltage $V_{in}$ of the switched mode power supply 100. This is achieved using both the input $V_{in}$ and output $V_{out}$ voltages in the generation of the duty cycle control signal D.

This improves the damping of oscillations on the output due to input voltage transients, while maintaining the duty cycle near to 100%, for maximum efficiency.

In order to maintain good load regulation and transient response a design margin for the nominal duty cycle $D_{nom}$ has to be introduced. Simulations and measurements performed by the present inventors show that a margin of a few percent is enough, yielding e.g. $D_{nom} \approx 97\%$. Hence, the power efficiency of an embodiment is almost at maximum and not reduced much compared with a fixed radio converter, but the embodiment provides improved transient response and load regulation.

It should be noted that, because the duty cycle of an embodiment is controlled near the natural border of 100%, methods should be employed to avoid integral wind-up. For example, well-known saturation circuitry of the integral value can be used to solve this issue.

Figure 6:
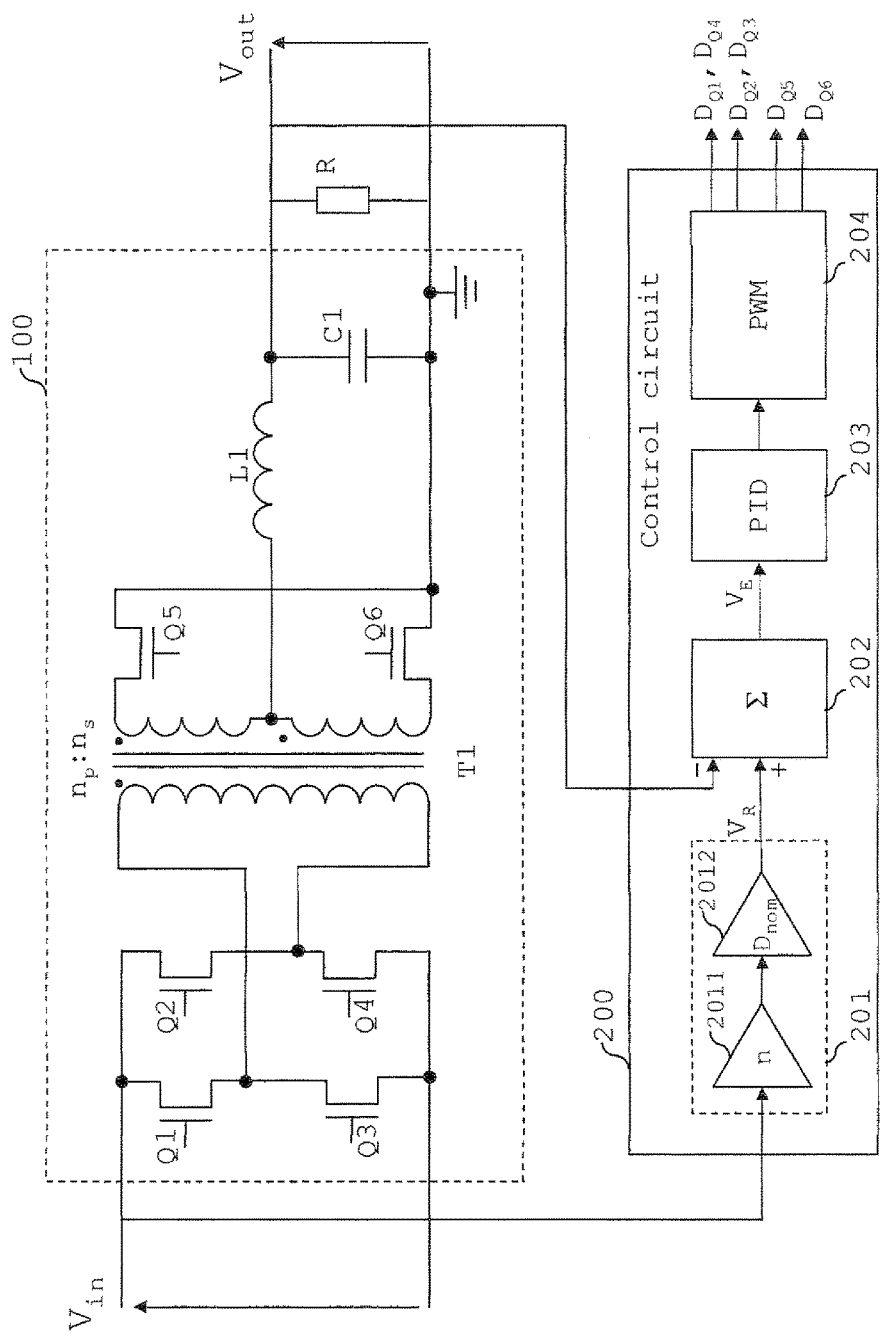
FIG. 6 is a circuit diagram showing the interconnection of the control circuit of the first embodiment with a switched mode power supply, so that the control circuit can control the duty cycle of the switched mode power supply.

FIG. 6 depicts the integration of a switched mode power supply 100 with the control circuit 200 of an embodiment. In this figure, a typical switched mode power supply 100 is shown. Operation of this SMPS is achieved through control of six transistors, Q1-Q6. Running this SMPS with a maximised duty cycle of 100% will result in maximised power efficiency. This circuit is directed to a DC-DC converter, using a transformer T1. An H-bridge is provided to generate an AC signal, formed from switching elements Q1-Q4. Specifically, Q1 and Q4 will initially be switched on and Q2 and Q3 switched off. This generates a positive-swinging signal across the transformer's primary coil thereby resulting is a change in flux. As a result, a voltage is induced across the transformer's secondary coil. Q6 can then be switched on, and Q5 switched off to provide rectification of the signal. Similarly, the same is performed inversely to generate a negative-swinging signal, by turning Q1, Q4 and Q6 off and turning Q2, Q3 and Q5 on to capture energy from the negative portion of the cycle.

As shown in FIG. 6, and as described above with reference to previous figures, the control circuit 200 has inputs indicative of the input voltage $V_{in}$ and output voltage $V_{out}$ of the switched mode power supply 100. Based on these inputs, the control circuit 200 generates various duty cycle control signals D for controlling the various switching elements of the switched mode power supply 100, as described below. In this case the ground reference is at the secondary side.

Figure 7:
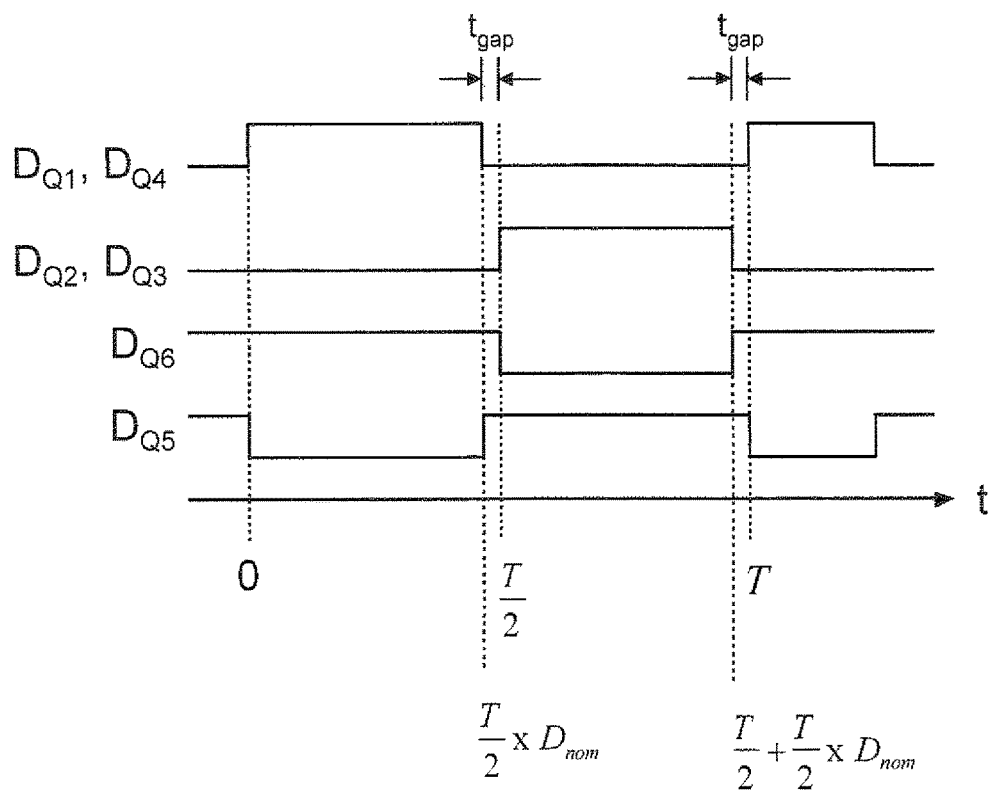
FIG. 7 is a timing diagram showing control signals, produced in the control circuit of FIG. 6, for switching elements in the switched mode power supply.

FIG. 7 depicts an exemplary timing diagram for the various control signals as output from the control circuit 200 to control the duty cycle of the SMPS 100. The control signals relate to the switching elements of the SMPS 100, as depicted in FIG. 6.

As shown in FIG. 7, the control signs for Q1 and Q4 (labelled $D_{Q1}$ and $D_{Q4}$) closely match the inverse of the control signals for Q2 and Q3 (labelled $D_{Q2}$ and $D_{Q3}$). This generates alternate positive and negative voltage cycles on the primary side of the transformer T1. This induces a changing flux in the transformer T1 and thereby induces a voltage across the secondary side of the transformer T1.

The small timing gap $t_{gap}$ between the end the control signal for Q1 and Q4 and the start of the control signal for Q2 and Q3 is due to $D_{nom}$ not being exactly 100% but instead being around 97% in the present embodiment. As a result, the length of the 'on-time' for Q1 and Q4 is substantially $T/2 \times D_{nom}$, where T is the length of a cycle. Similarly the 'on-time' for Q2 and Q3 is also substantially $T/2 \times D_{nom}$. The control circuit 200 controls the 'on-time' to maintain good load regulation and transient response by controlling the size of the timing gap $t_{gap}$.

FIG. 7 also shows typical control signals for Q5 and Q6 (labelled $D_{Q5}$ and $D_{Q6}$). As shown, at the end of the first half 'on period' for Q1 and Q4, Q5 is switched on whilst Q6 is on. This generates a conductive path to allow the discharging of inductor L1 into capacitor C1 and the load R. After this, Q6 is switched off and Q5 is left on to perform rectification of the signal from the secondary side of the transformer T1.

Experimental Results

The inventors have performed simulation experiments to compare the performance of an SMPS 100 controlled using a control circuit 200 according to an embodiment of the present invention with an unregulated SMPS, to show the improvement, as made by embodiments of the present invention, in terms of input voltage transient and load transient behavior.

Figure 8:
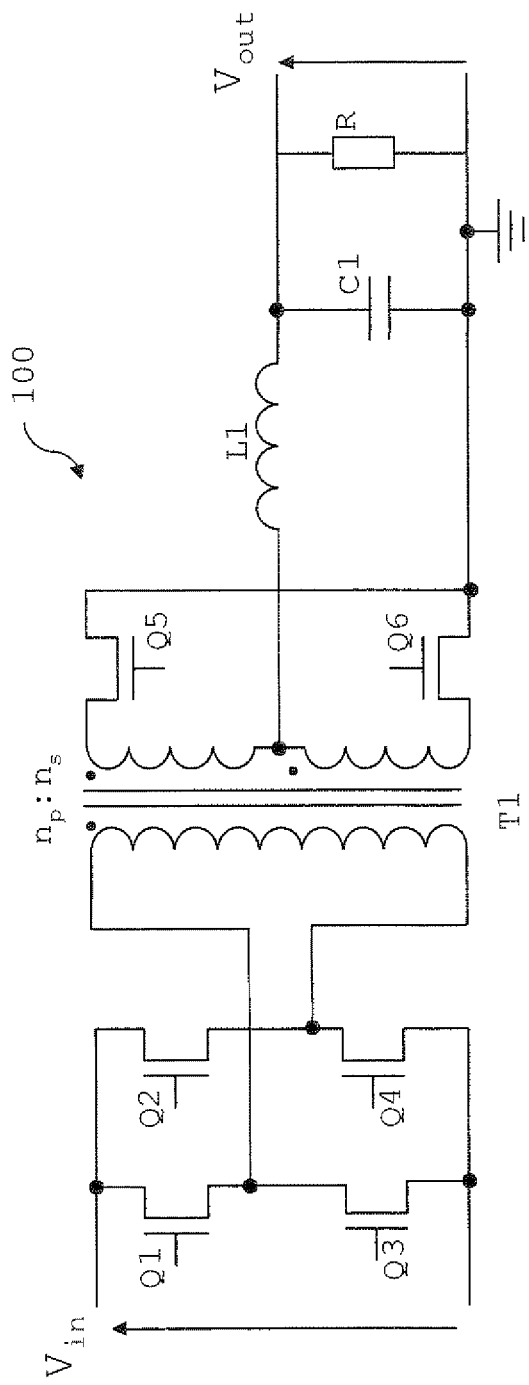
FIG. 8 shows a known DC-DC switched mode power supply which was used in a test comparison against the embodiment of the present invention shown in FIG. 6.

More particularly, the inventors compared the performance of the SMPS 100 and control circuit 200 shown in FIG. 6 and detailed above with the SMPS 100 shown in FIG. 8. The SMPS 100 shown in FIG. 8 is the same as the SMPS 100 shown in FIG. 6, but it is operated in an unregulated mode and therefore does not benefit from the control of the control circuit 200 of embodiments of the present invention.

In the experiments, the SMPS 100 had an input voltage range of 38-55V and a transformer ratio of 4:1, yielding an ideal output voltage range of 9.5-13.75V. The maximum output load current was 33 A.

FIGS. 9 to 12 show the results of the experiments.

Figure 9:
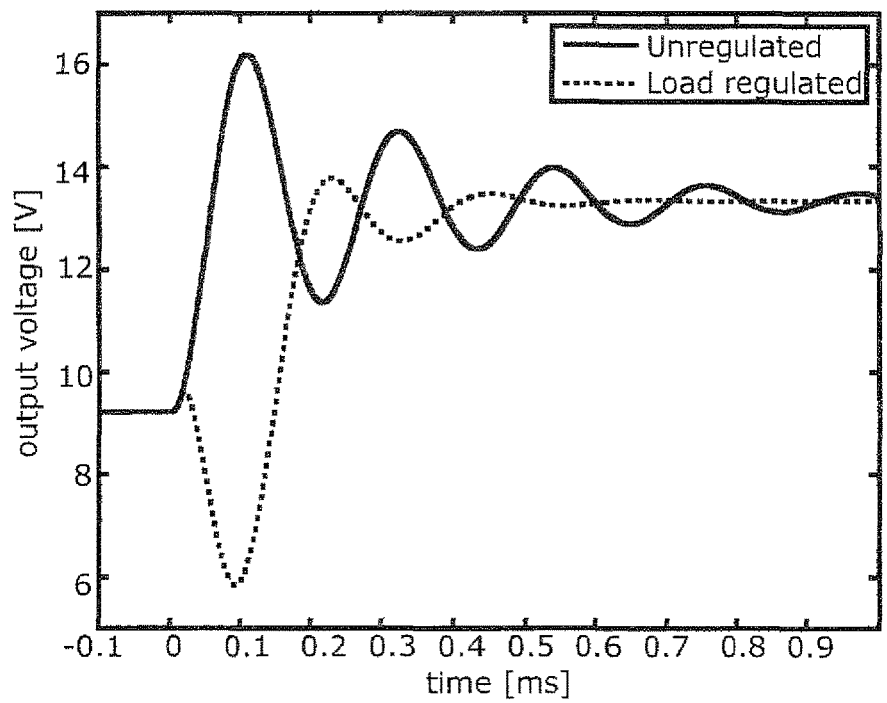
FIG. 9 shows experimental results from the test comparison comparing the performance of the embodiment of the present invention with the known unregulated converter for the case of an input voltage step from 38V to 55V with a load current of 0 A.

In FIG. 9 the input voltage transients of the fixed ratio (4:1) unregulated converter, and the load regulated converter controlled in accordance with the control circuit 200 according to an embodiment of the present invention are shown for a scenario in which the input voltage step raises from 38V to 55V with a rise time of 100 μs and with a load current of 0 A.

The unregulated converter shows a rapid output voltage increase with a large overshoot and large ringing with less damping compared with the load regulated converter.

The inventors have found that the voltage dip in the regulated converter is due to a delay in the measurement of the input voltage, and have further found that reducing this delay will reduce this dip.

The inventors have also found that another solution to prevent the initial dip in output voltage of the load regulated converter is to perform control using the control circuit 200 to limit the duty cycle range, so as to apply a minimum duty cycle, for example of 70%. This prevents the duty cycle control signal generator 204 from outputting a control signal D with a duty cycle below 70%.

Figure 10:
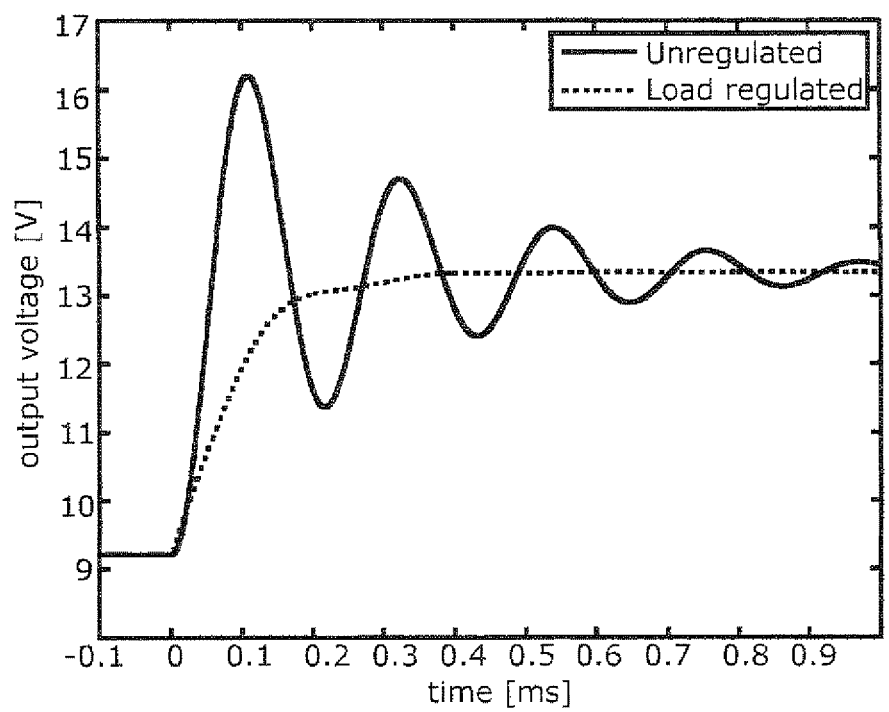
FIG. 10 shows experimental results from the test comparison comparing the performance of the embodiment of the present invention with the known unregulated converter for the case of an input voltage step from 38V to 55V with a load current of 0 A but with the embodiment controlling the SMPS to have a load regulated supply with a minimum duty cycle.

The simulation of FIG. 9 (voltage rise from 38V to 55V with a rise time of 100 μs and with a load current of 0 A) was therefore repeated applying a minimum duty cycle of 70% to the load regulated converter. The results are shown in FIG. 10. As shown in FIG. 10, the dip is removed and the damping of the oscillations is improved by applying a minimum duty cycle threshold.

Figure 11:
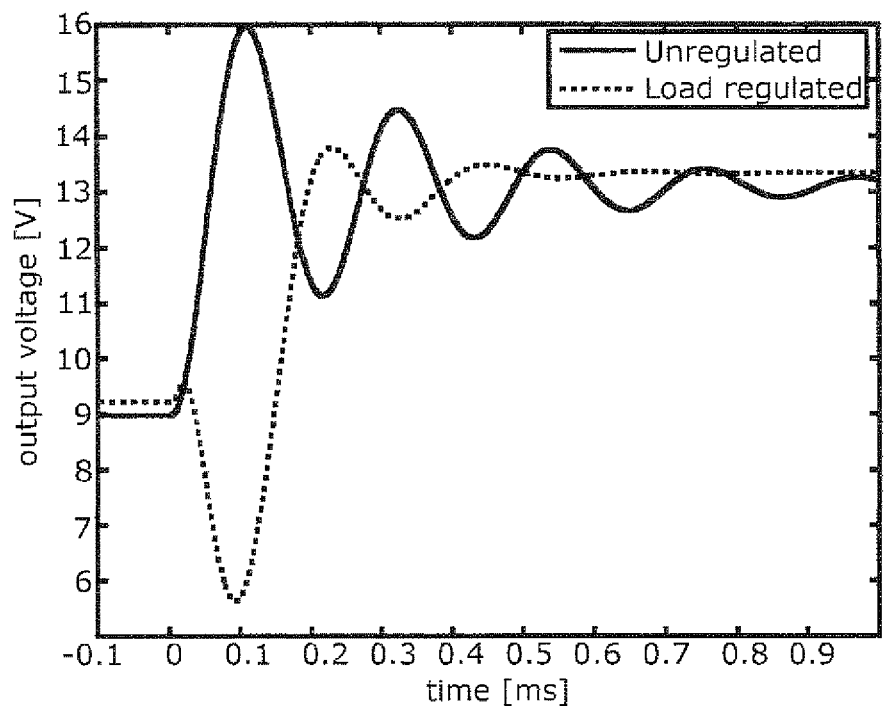
FIG. 11 shows experimental results from the test comparison comparing the performance of the embodiment of the present invention with the known unregulated converter for the case of an input voltage step from 38V to 55V with a load current of 33 A.

FIG. 11 shows the results of performing the same simulation as in FIG. 9 but carried out at the full load current of 33 A instead of 0 A. This illustrates the load regulation by the steady state voltage drop in the unregulated converter since the initial and final output voltages of the unregulated converter are below the ideal levels, which are exhibited by the load regulated converter. It will also be seen that the damping of the load regulated converter is far superior to that of the unregulated converter.

Figure 12:
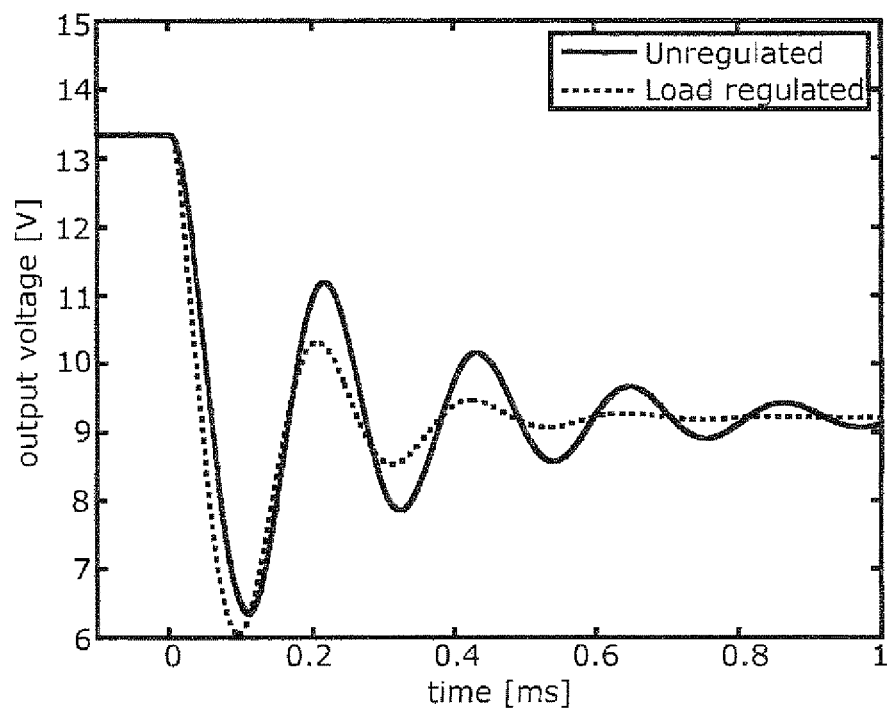
FIG. 12 shows experimental results from the test comparison comparing the performance of the embodiment of the present invention with the known unregulated converter for the case of an input voltage step from 55V to 38V with a load current of 0 A.

FIG. 12 shows the output voltage $V_{out}$ of the switched mode power supply 100 during a negative input voltage step from 55V down to 38V with the load current of 0 A in 100 μs. It will be seen that the damping of the load regulated convertor is far superior to that of the unregulated convertor.

Figure 13:
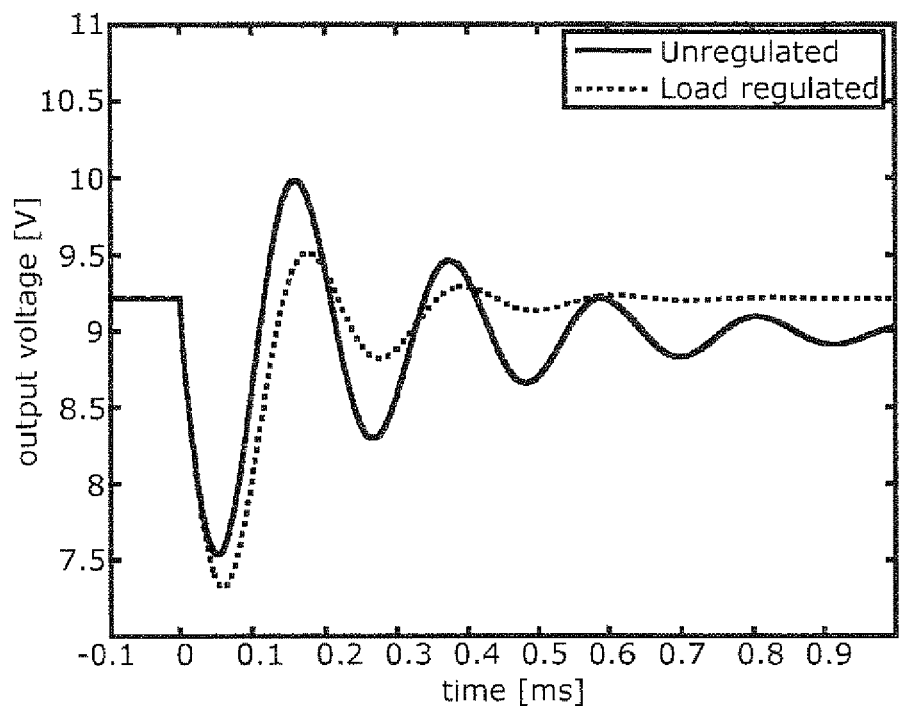
FIG. 13 shows experimental results from the test comparison comparing the performance of the embodiment of the present invention with the known unregulated converter for the case of a positive load step from 0 A to 33 A at an input voltage of 38V.

FIG. 13 shows the results of a positive load step from 0 A to 33 A in 1 μs at an input voltage of 38V. The regulated converter has a reduced undershoot with damped oscillations, while the unregulated converter has more undershoot and much less damped oscillations. The steady state output voltage also shows the improved load regulation, i.e., the output voltage is not dependent on the load current since the final output voltage of the unregulated converter is far below the desired levels exhibited by the load regulated converter.

Figure 14:
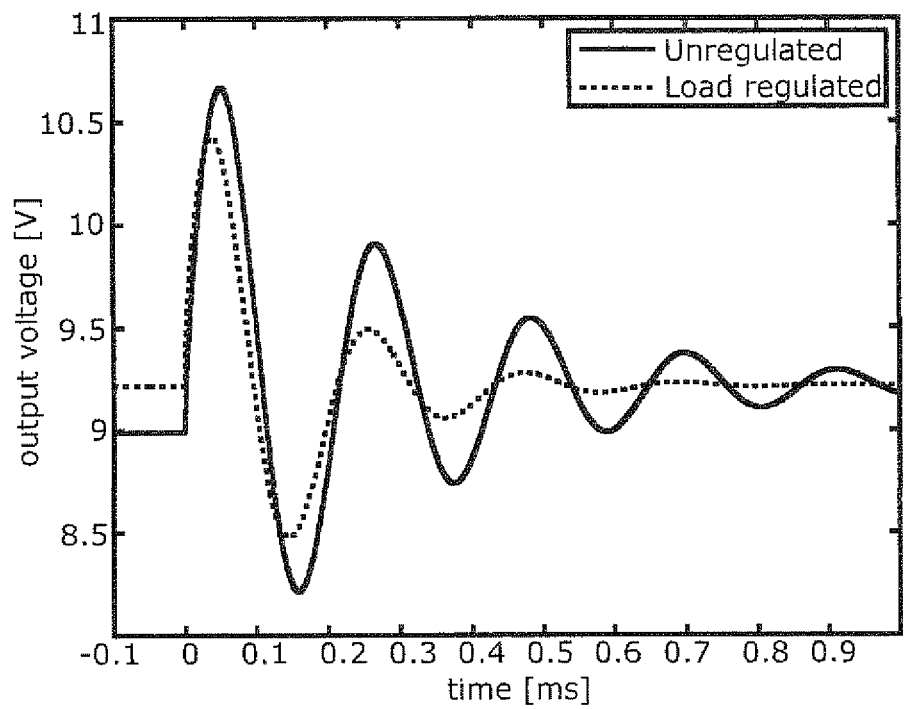
FIG. 14 shows experimental results from the test comparison comparing the performance of the embodiment of the present invention with the known unregulated converter for the case of a negative load step from 33 A to 0 A at an input voltage of 38V.

Similarly, FIG. 14 depicts a negative load step from 33 A to 0 A in 1 μs at the input voltage of 38V. Again, the load regulated converter exhibits less overshoot with greater damping of the oscillations.

[Modifications and Variants]

Many modifications and variations can be made to the embodiments, without departing from the scope of the present invention.

For example, the control circuit 200 can be implemented using either analog or digital electronics, with no loss of performance.

The control circuit 200 of the above described embodiments is a separate unit which provides control signals for controlling the duty cycle of the SMPS 100. However, instead, the control unit 200 may be incorporated within the SMPS 100.

The regulator 203 may be of any type and not specifically a PID regulator. For example, it may be a PI, PD, or lead lag compensation or other types of regulators could be used.

The control strategy, as detailed in the above described embodiments, could be complemented with voltage feed forward compensation.

Since the SMPS 100 may be an isolated SMPS 100, then the control circuit 200 could be placed on the primary or secondary side of the transformer T1. However, the preference is for placement on the secondary side.

Depending on the placement of the control circuit 200, then one of either the output voltage $V_{out}$ of the switched mode power supply 100 or the input voltage $V_{in}$ of the switched mode power supply 100 must be transferred over the isolation barrier. There are many well known techniques for achieving this, for example sampling of the voltage on the secondary side of the transformer T1 of the switched mode power supply 100 during the on-period is a good measurement of the input voltage, including the transformer ratio n.

Further, the control circuit 200 is not limited to controlling the SMPS topology of a full-bridge, center-tapped secondary side transformer with synchronous rectification, as shown in FIG. 6. Instead, the above described embodiments of the present invention will work equally well with many topologies including push-pull, half-bridge and forward converters topologies. Equally, the above described control circuit 200 can used with SMPSs with a single winding secondary side transformer. Additionally, it also works with SMPSs with diode rectification on the secondary side.

The inventors have found that the above described control circuit 200 of embodiments of the present invention works particularly well when implemented with active droop which enables passive current sharing or the paralleling of several identical SMPS converters.

Figure 15:
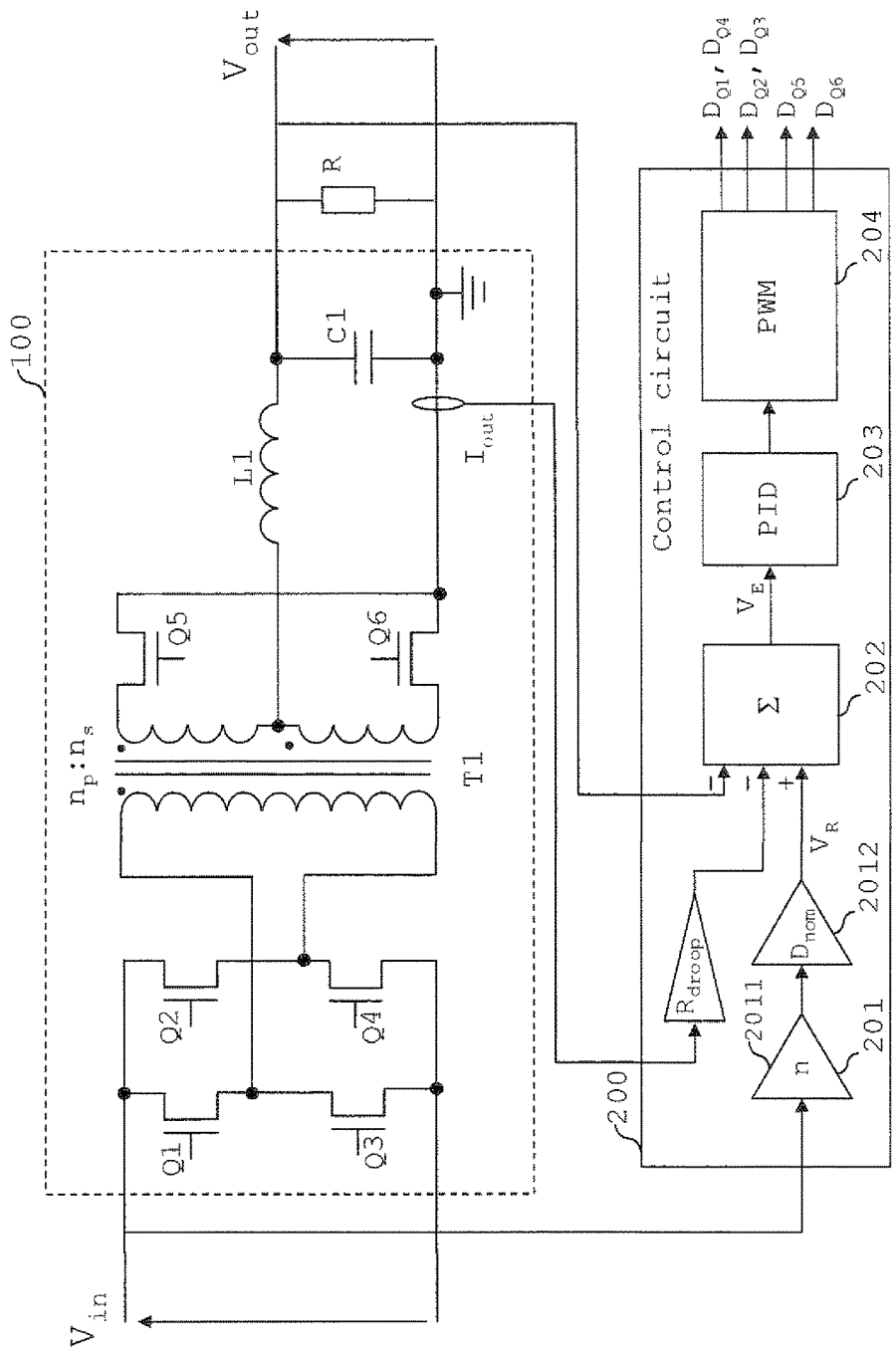
FIG. 15 shows a modification to a control circuit of the first embodiment with the inclusion of droop processing.

FIG. 15 shows an embodiment of the control circuit 200 which incorporates active droop. In this embodiment, the active droop is obtained by measuring the output current $I_{out}$ and then modifying the calculation of the error signal according to the following equation:

$$V_E = nD_{nom}V_{in} - V_{out} - I_{out}R_{droop} \quad \text{Equation 5}$$

In Equation 5 above, $n = n_s/n_p$ is the transformer turns ratio if it exists in the SMPS, $D_{nom}$ is the nominal duty cycle, $V_{in}$ is the input voltage of the switched mode power supply 100, $V_{out}$ is the output voltage of the switched mode power supply 100, $I_{out}$ is the output current of the switched mode power supply 100 and $R_{droop}$ is the artificial droop resistance.

Other modifications are, of course possible.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A switched mode power supply having a control circuit operable to generate a control signal to control the duty cycle of the switched mode power supply, the control circuit comprising:
an input reference voltage generator operable to receive a signal indicative of an input voltage ($V_{in}$) of the switched mode power supply and operable to generate a reference signal ($V_R$) directly proportional to the input voltage ($V_{in}$);
an error signal generator operable to receive a signal indicative of an output voltage ($V_{out}$) of the switched mode power supply and operable to generate an error signal ($V_E$) based on the reference signal ($V_R$) and based on the output voltage ($V_{out}$); and,
a duty cycle control signal generator operable to generate the control signal (D) to control the duty cycle of the switched mode power supply in dependence upon the error signal ($V_E$).

2. The switched mode power supply according to claim 1, further comprising a regulator operable to generate a signal defining a duty cycle ratio in dependence upon the error signal ($V_E$), wherein the duty cycle control signal generator is arranged to generate the control signal in dependence upon the signal defining the duty cycle ratio.

3. The switched mode power supply according to claim 2, wherein the regulator is a PID regulator.

4. The switched mode power supply according to claim 2, wherein the regulator is a PI regulator.

5. The switched mode power supply according to claim 2, wherein the regulator is a PD regulator.

6. The switched mode power supply according to claim 2, wherein the regulator is a lead lag compensation regulator.

7. The switched mode power supply according to claim 1, wherein the input reference voltage generator comprises a nominal duty cycle multiplier operable to multiply the input voltage of the switched mode power supply by a nominal duty cycle.

8. The switched mode power supply according to claim 7, wherein the input reference voltage generator comprises a transformer turns ratio multiplier operable to multiply the input voltage (Vi) of the switched mode power supply by a transformer turns ratio, wherein the nominal duty cycle multiplier is operable to multiply the output of the transformer turns ratio multiplier by the nominal duty cycle.

9. The switched mode power supply according to claim 1, wherein the error signal generator is operable to receive a signal indicative of an output current ($I_{out}$) of the switched mode power supply and operable to generate the error signal ($V_E$) based on the reference signal ($V_R$), the output voltage ($V_{out}$) and the output current ($I_{out}$).

10. The switched mode power supply according to claim 1, wherein the duty cycle control signal generator comprises a pulse width modulator.

11. The switched mode power supply according to claim 1, wherein the duty cycle control signal generator is arranged to generate a control signal (D) to keep the duty cycle of the switched mode power supply above a predetermined minimum value.

12. A method in a switched mode power supply for generating a control signal to control the duty cycle of the switched mode power supply, the method comprising: receiving a signal indicative of an input voltage (Vi) of the switched mode power supply; receiving a signal indicative of an output voltage (Vout) of the switched mode power supply; generating a reference signal (VR) directly proportional to the input voltage; generating an error signal (VE) based on the reference signal (VR) and based on the output voltage; and, generating the control signal (D) to control the duty cycle of the switched mode power supply in dependence upon the error signal.

13. The method according to claim 12, wherein the method further comprises regulating the error signal ($V_E$) to generate a signal defining a duty cycle ratio; and, the control signal is generated in dependence upon the signal defining the duty cycle ratio.

14. The method according to claim 13, wherein the error signal is regulated using a PID regulator.

15. The method according to claim 13, wherein the error signal is regulated using a PI regulator.

16. The method according to claim 13, wherein the error signal is regulated using a PD regulator.

17. The method according to claim 13, wherein the error signal is regulated using a lead lag compensation regulator.

18. The method according to claim 12, wherein the reference voltage ($V_R$) is generated by multiplying the input voltage ($V_{in}$) of the switched mode power supply by a nominal duty cycle.

19. The method according to claim 18, wherein the reference voltage (VR) is generated by multiplying the input voltage (Vin) of the switched mode power supply by a transformer turns ratio and by the nominal duty cycle.

20. The method according to claim 12, wherein the method further comprises receiving a signal indicative of an output current ($I_{out}$) of the switched mode power supply; and, the error signal ($V_E$) is generated based on the reference signal ($V_R$), the output voltage ($V_{out}$) and the output current ($I_{out}$).

21. The method according to claim 12, wherein the control signal (D) is generated by generating a pulse width modulated signal in dependence upon the error signal.

22. The method according to claim 12, wherein the control signal (D) is generated to keep the duty cycle of the switched mode power supply above a predetermined minimum value.

* * * * *